J. S. & R. HAWKINS.
Harvester.
No. 25,194.
2 Sheets—Sheet 1.
Patented Aug. 23, 1859.
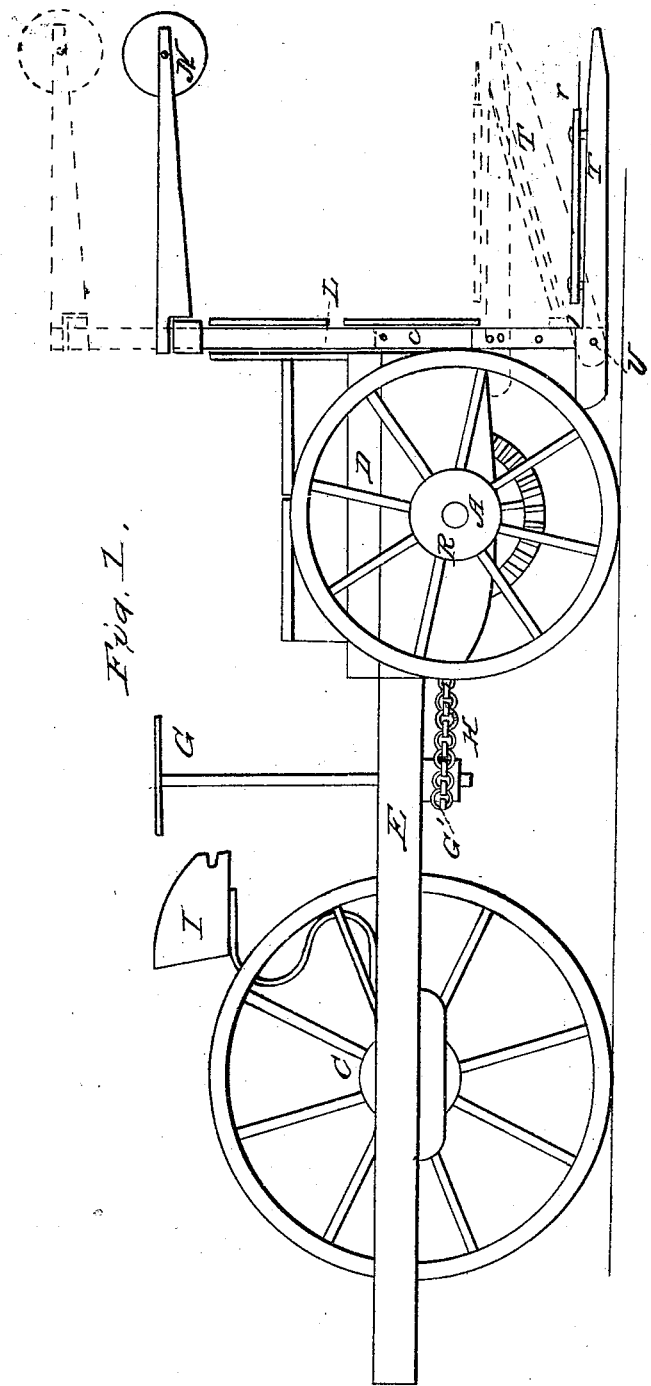

J. S. & R. HAWKINS.
Harvester.
No. 25,194.
2 Sheets—Sheet 2.
Patented Aug. 23, 1859.
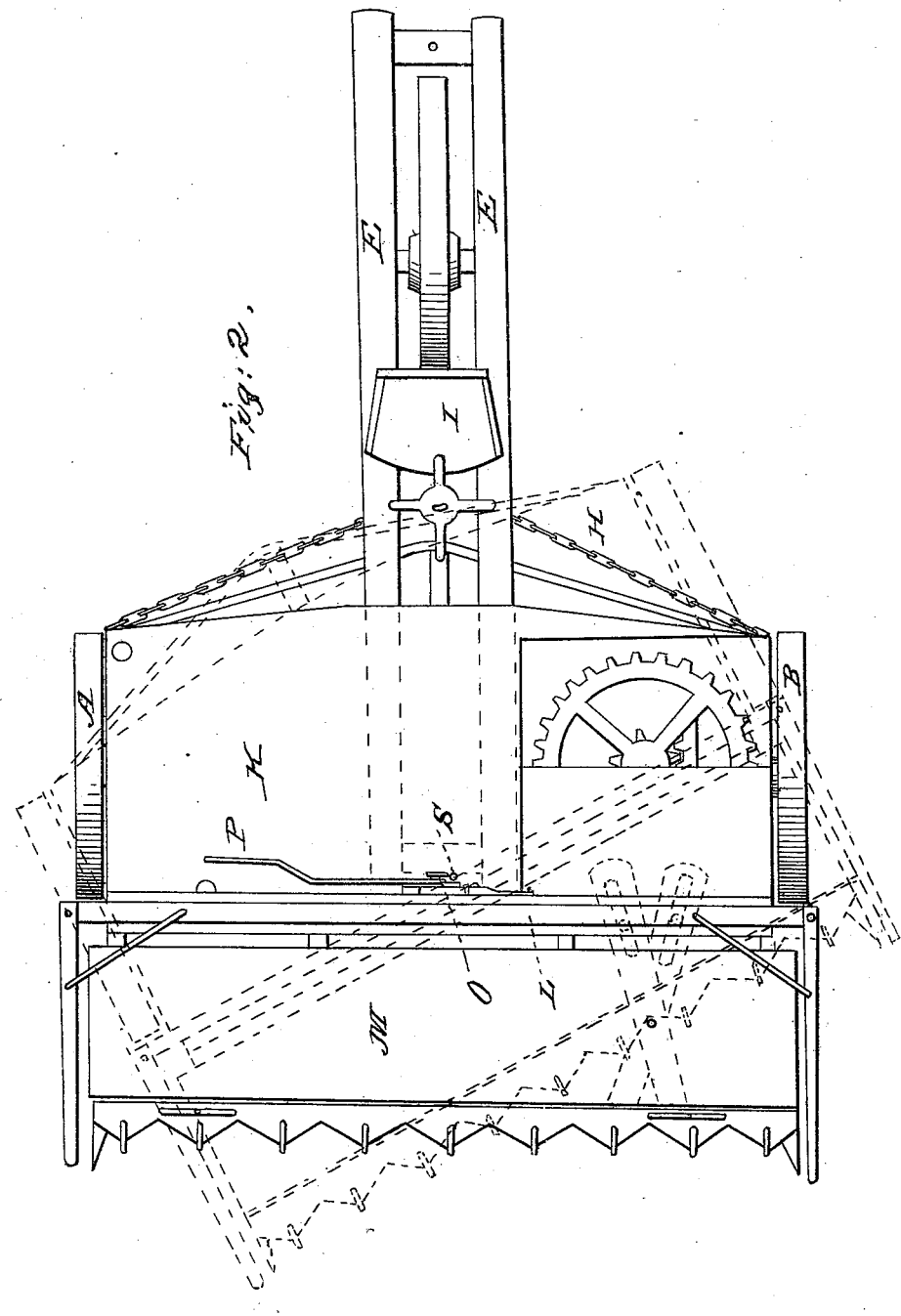

UNITED STATES PATENT OFFICE.

J. S. HAWKINS AND R. HAWKINS, OF GREENFIELD, INDIANA.

IMPROVEMENT IN HARVESTERS.

Specification forming part of Letters Patent No. 25,194, dated August 23, 1859.

*To all whom it may concern:*

Be it known that we, JOHN S. HAWKINS and REZIN HAWKINS, of Greenfield, in the county of Hancock and State of Indiana, have invented a new and Improved Harvester and Mower; and we do hereby declare that the following is a full and exact description thereof, reference being had to the accompanying drawings, and to the letters of reference marked thereon.

Our harvester and mower belongs to that class in which the team travels directly behind the machine, altogether avoiding the side draft.

Our invention consists in the construction of a mower and harvester with a peculiar arrangement of the main frame and team-shaft, in combination with an adjustable frame for elevating and depressing the grain-table, cutters, and reel; and also in an improved flexible shoe for guiding the points of the cutters, in order to cut the grass very close, and yet to prevent the cutters from being thrust into the ground, and also to avoid the heavy dragging of the front of the machine.

In the accompanying drawings, Figure 1 is a side view of our harvester and mower. Fig. 2 is a top view of the same.

Our harvester is supported by the two traveling wheels A and B and the shaft-wheel C. The main frame D is very short, extending but little beyond the traveling wheels A and B. The shaft E is pivoted to the main frame D at S, Fig. 2, so that the frame, grain-table, and traveling wheels can be turned upon the pivot S, as shown in red lines, Fig. 2, while the team-shaft E and wheel C remain stationary. Attached to the team-shaft E, between the driver's seat I and the grain-table K, is a capstan, G, having at its foot a toothed wheel, G', the teeth of which fit into the links of the chain H. By means of this capstan and chain the wheels A B and the body of the machine are turned with ease. The pivot S is in front of the axle frame D, some distance in advance of the axle R and near the center of the whole body of the machine. The chain H, being attached to the sides of the frame D and at a considerable distance behind the pivot S, has a great leverage. Consequently the capstan G acts very powerfully, and may roll back one wheel, as B, Fig. 2, while it rolls forward the other. In this way our machine may be turned very quickly and on a small area, which is an important advantage, even in a smooth field, while it enables our harvester to work successfully in the angles of fences and among stumps and other obstacles, where with common mowers it would be impossible to cut the grass. The pivot S, which is in effect the king-bolt, being some distance forward of the axle R, and, acting upon the front of the frame D, prevents the thrust-draft from tending to tilt the frame D forward and pitch the cutters upon the ground, as is usually the case where the thrust-draft is applied to the main frame behind the axle, or to the axle, upon which the frame is naturally inclined to tilt or vibrate.

Just in front of the pivot or draft bolt S a frame, L, is arranged to slide up and down in the main frame D, elevating and depressing the cutters, the grain-table M, and the reel N, as shown in Fig. 1, where the frame L is represented in red lines as being elevated. This sliding frame is raised and lowered by means of a ratchet-wheel, O, Fig. 2, and a lever, P, acting upon a cord attached to the lower part of frame L, and winding round the axle of ratchet-wheel O, forming a sort of windlass. In this manner the cutters and grain-table may be elevated to cut grain and lowered to cut grass, and also raised in passing stones and other obstacles.

Among many advantages of this construction of machine, one is the convenience of employing large wheels without throwing the cutters far beyond the axle R and draft-bolt S, or inclining the fingers to drag heavily upon the ground.

On the lower part of frame L, and at each end of the grain-table M, is a shoe, T, which supports the grain-table and the cutters, and also extends forward, so as to form a divider to separate the grass to be cut from that left standing. The ends of the finger-beam are connected with these shoes, and there are several other shoes extending from the frame L to the finger-beam, but having no points like the two above described. These shoes are hinged to the frame L by pivots U, so that the front or toes T, with the points of the cutters V, may rise, as seen at T', Fig. 1. By this flexibility of the shoes and grain-table the points of the cutters always ride along upon the ground, rising and falling with the inequalities of the surface, and securing a close cut of the grass. Our machine works well in lodged grass.

We do not separately claim the vibration of the grain-table and points of the fingers. Neither do we claim as new a thrust team-shaft, a sliding frame, or any of the mechanical devices above described; but What we do claim as an improvement in harvesters and mowers, and desire to secure by Letters Patent of the United States, is—

The arrangement of the main frame and team-shaft, in combination with the adjustable frame L and hinged shoe or cutting apparatus T, constructed and operated in the manner substantially as described, for the purpose specified.

JOHN S. HAWKINS.
REZIN HAWKINS.

Witnesses:
  JOHN COOK,
  J. MATHERS.